United States Patent
Hutton et al.

(10) Patent No.: US 11,759,910 B1
(45) Date of Patent: Sep. 19, 2023

(54) METHOD OF MANUFACTURING WAFER HOLDER

(71) Applicant: P.R. HOFFMAN MACHINE PRODUCTS INC., Carlisle, PA (US)

(72) Inventors: David Melville Hutton, Carlisle, PA (US); Gary William Wimmersberger, Middletown, PA (US); Mara Lindsay Pagano, Carlisle, PA (US)

(73) Assignee: P. R. HOFFMAN MACHINE PRODUCTS, INC., Carlisle, PA (US)

( * ) Notice: Subject to any disclaimer, the term of this patent is extended or adjusted under 35 U.S.C. 154(b) by 836 days.

(21) Appl. No.: 16/718,800

(22) Filed: Dec. 18, 2019

Related U.S. Application Data

(60) Division of application No. 15/825,365, filed on Nov. 29, 2017, now Pat. No. 10,556,317, which is a
(Continued)

(51) Int. Cl.
*B29C 65/48* (2006.01)
*B24B 37/27* (2012.01)
(Continued)

(52) U.S. Cl.
CPC .............. *B24B 37/27* (2013.01); *B24B 37/24* (2013.01); *B24B 37/30* (2013.01); *B24B 41/02* (2013.01); *B29C 65/48* (2013.01); *B24B 37/345* (2013.01)

(58) Field of Classification Search
CPC ......... B24B 37/27; B24B 37/24; B24B 37/30; B24B 41/02; B24B 37/345; B29C 65/48; H01L 21/67326; H01L 21/6733
See application file for complete search history.

(56) References Cited

U.S. PATENT DOCUMENTS 4,512,113 A * 4/1985 Budinger ................ B24B 37/30
451/283
5,198,054 A * 3/1993 Drake ...................... B41J 2/155
156/64
(Continued)

FOREIGN PATENT DOCUMENTS

DE          10009656 B4     12/2005
DE     102013200756 A1      8/2014
(Continued)

OTHER PUBLICATIONS

Decision of Rejection issued to Japanese counterpart Application No. JP 2020-004965 dated Nov. 24, 2021.
(Continued)

*Primary Examiner* — Matthew J Daniels
*Assistant Examiner* — Andrew L Swanson
(74) *Attorney, Agent, or Firm* — McNees Wallace & Nurick LLC

(57) ABSTRACT

A method of manufacturing a wafer holder, the wafer holder having a frame having at least one cavity capable of receiving and supporting a wafer grown from an ingot to be polished in a polishing machine, the at least one cavity having a cross sectional footprint at least equal to a cross sectional footprint of the wafer, the wafer having a thickness to cross sectional area ratio of 0.001 per unit length or less, a polymer film pad being permanently affixed in the at least one cavity, including cutting a frame from a layer of a thermoset or thermoplastic material having a thickness tolerance and measuring a thickness of the frame at at least one location thereon. The method further includes forming a cavity in the frame having a predetermined depth, and permanently affixing a polymer film pad in the cavity.

2 Claims, 9 Drawing Sheets

Related U.S. Application Data continuation-in-part of application No. 15/447,825, filed on Mar. 2, 2017.

(60) Provisional application No. 62/303,215, filed on Mar. 3, 2016.

(51) Int. Cl.
  B24B 37/30 (2012.01)
  B24B 41/02 (2006.01)
  B24B 37/24 (2012.01)
  B24B 37/34 (2012.01)

(56) References Cited

U.S. PATENT DOCUMENTS

| | | |
|---|---|---|
| 5,769,696 A | 6/1998 | Lee et al. |
| 5,882,245 A | 3/1999 | Popovich et al. |
| 5,921,853 A | 7/1999 | Nishio |
| 6,442,825 B1 | 9/2002 | Pomerantz |
| 6,709,981 B2 | 3/2004 | Grabbe et al. |
| 6,924,016 B2 | 8/2005 | Wanat et al. |
| 7,579,259 B2 | 8/2009 | Fournel et al. |
| 7,605,009 B2 | 10/2009 | Mcavoy et al. |
| 7,790,503 B2 | 9/2010 | Lin et al. |
| 8,795,033 B2 | 8/2014 | Fletcher et al. |
| 9,219,004 B2 | 12/2015 | Moriceau et al. |
| 9,337,086 B2 | 5/2016 | Scanlan |
| 9,539,695 B2 | 1/2017 | Pietsch et al. |
| 2001/0014570 A1 | 8/2001 | Wenski et al. |
| 2007/0151951 A1 | 7/2007 | Yoshioka et al. |
| 2011/0256813 A1 | 10/2011 | Fletcher et al. |
| 2013/0017765 A1 | 1/2013 | Coad et al. |
| 2015/0273650 A1* | 10/2015 | Namiki ............... B24B 37/015 451/5 |
| 2016/0101502 A1* | 4/2016 | Albrecht ........... H01L 21/67092 451/398 |

FOREIGN PATENT DOCUMENTS

| | | |
|---|---|---|
| FR | 2913815 A1 | 9/2008 |
| JP | 6310059 | 1/1988 |
| JP | 02257626 | 10/1990 |
| JP | H0661203 | 3/1994 |
| JP | 09157628 | 6/1997 |
| JP | 09260471 | 10/1997 |
| JP | 10118920 | 5/1998 |
| JP | 200339306 A | 2/2003 |
| JP | 2004051468 | 2/2004 |
| JP | 2005-246574 | 9/2005 |
| JP | 2006123092 A | 5/2006 |
| JP | 3851310 B2 | 11/2006 |
| JP | 2009160706 A | 7/2009 |
| JP | 2010174094 | 8/2010 |
| JP | 2010247254 | 11/2010 |
| JP | 2014184511 | 10/2014 |
| JP | 2016193488 | 11/2016 |
| WO | 0069595 | 11/2000 |

OTHER PUBLICATIONS

Mainuddin, Mohammad, "Precision polishing dynamics: The influence of process vibrations on polishing results", The University of North Carolina at Charlotte, 2014.

Zhang, Zhenyu, et al., "Material removal mechanism of precision grinding of soft-brittle CdZnTe wafers", The International Journal of Advanced Manufacturing Technology 46.5, 2010.

Abhulimen, I. U., et al., "Fabrication and testing of through-silicon vias used in three-dimensional integration", Journal of Vacuum Science & Technicology B: Microelectronics and Nanometer Structures Processing, Measurement, and Phenomena 26.6, 2008.

Muneeb, Muhammad, "Chemical-mechanical polishing process development for III-V/SOI waveguide circuits", Jun. 2010.

* cited by examiner

METHOD OF MANUFACTURING WAFER HOLDER

FIELD OF THE INVENTION

The present invention is directed to the field of polishing machines, including but not limited to a polishing machine wafer holder method for manufacturing same.

BACKGROUND OF THE INVENTION

Polishing machines utilize wafer holders to hold and support flat wafers, such as silicon wafers that are used in the electronics industry.

There is a need for wafer holders and methods for manufacturing wafer holders that permit production of wafers having improved precision, as well as having improved service lives.

SUMMARY OF THE INVENTION

In one embodiment, a method of manufacturing a wafer holder is provided, the wafer holder having a frame having at least one cavity capable of receiving and supporting a wafer grown from an ingot to be polished in a polishing machine, the at least one cavity having a cross sectional footprint at least equal to a cross sectional footprint of the wafer, the wafer having a thickness to cross sectional area ratio of 0.001 per unit length or less, a polymer film pad being permanently affixed in the at least one cavity, the method including cutting a plurality of first frame portions from a first layer of a thermoset or thermoplastic material having a first thickness tolerance. The method further includes cutting a plurality of second frame portions from a second layer of a thermoset or thermoplastic material having a second thickness tolerance. The method further includes cutting a plurality of third frame portions from a third layer of a thermoset or thermoplastic material having a third thickness tolerance. The method further includes measuring a thickness of each first frame portion at at least one location thereon, and measuring a thickness of each second frame portion at at least one location thereon. The method further includes sorting and combining each first frame portion having a first thickness at a first extent of the first thickness tolerance with a corresponding second frame portion having a second thickness at a second extent of the second thickness tolerance, wherein the first extent of the first thickness tolerance is opposite the second extent of the second thickness tolerance to thereby reduce the resulting tolerance of the sum of the thickness of the first and second frame portions. The method further includes securing each sorted and combined first frame portion and second frame portion to one another. The method further includes forming a peripheral edge and alignment features in each sorted and combined first frame portion and second frame portion. The method further includes forming a peripheral edge and alignment features in each third frame portion and forming at least one opening in each sorted and combined and secured first frame portion and second frame portion. The method further includes aligningly arranging the corresponding second frame portion of each sorted and combined and secured second frame portion with a corresponding third frame portion. The method further includes securing each sorted and combined and secured first frame portion and second frame portion, and corresponding third frame portion to one another, thereby forming a frame having at least one cavity. The method further includes permanently affixing a polymer film pad in the at least one cavity.

In another embodiment, a method of manufacturing a wafer holder, the wafer holder having a frame having at least one cavity capable of receiving and supporting a wafer grown from an ingot to be polished in a polishing machine, the at least one cavity having a cross sectional footprint at least equal to a cross sectional footprint of the wafer, the wafer having a thickness to cross sectional area ratio of 0.001 per unit length or less, a polymer film pad being permanently affixed in the at least one cavity, including cutting a frame from a layer of a thermoset or thermoplastic material having a thickness tolerance and measuring a thickness of the frame at at least one location thereon. The method further includes forming a cavity in the frame having a predetermined depth, and permanently affixing a polymer film pad in the cavity.

An advantage of exemplary embodiments is that the wafer holders permit preparation of wafers having improved precision, as well as the wafer holders having improved service lives.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

The wafer holder of the present invention is adapted for use in a polishing machine with wafers grown from an ingot having a thickness to cross sectional area of 0.001 or less. This includes, but is not intended to be limited to wafers having 2 inch, 4 inch, 6 inch, 12 inch and 18 inch diameters (with common, but not limited to) respective 0.002 inch, 0.008 inch, 0.018 inch, 0.032 inch, and 0.045 inch thicknesses. Additionally, the cavities of the wafer holder for receiving and supporting the wafers have cross sectional footprints that are at least equal to the cross sectional footprints of the wafers, in order to prevent the wafers from shattering before, during or after operation of the polishing machine, as smaller cavity cross sectional footprints, which would impart inwardly directed compressive forces along the periphery of the wafers will almost invariably result in shattering such delicate wafers.

Figure 1:
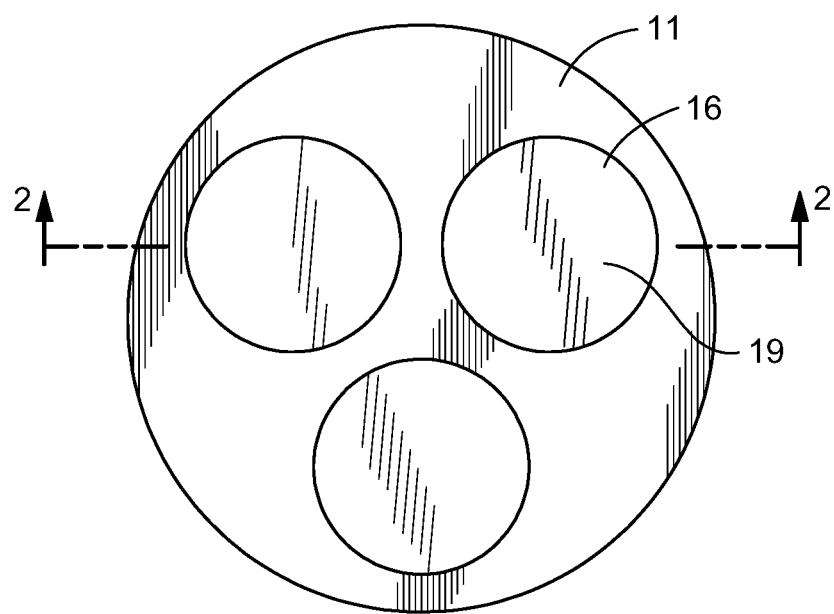
FIG. 1 is a wafer holder according to an embodiment of the disclosure.
Figure 2:
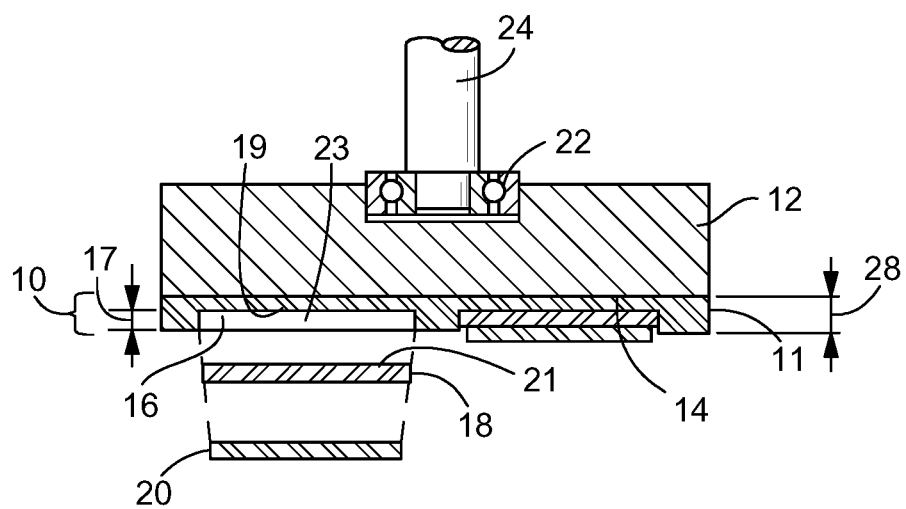
FIG. 2 is a section view taken along line 2-2 in FIG. 1 of the disclosure.
Figure 3:
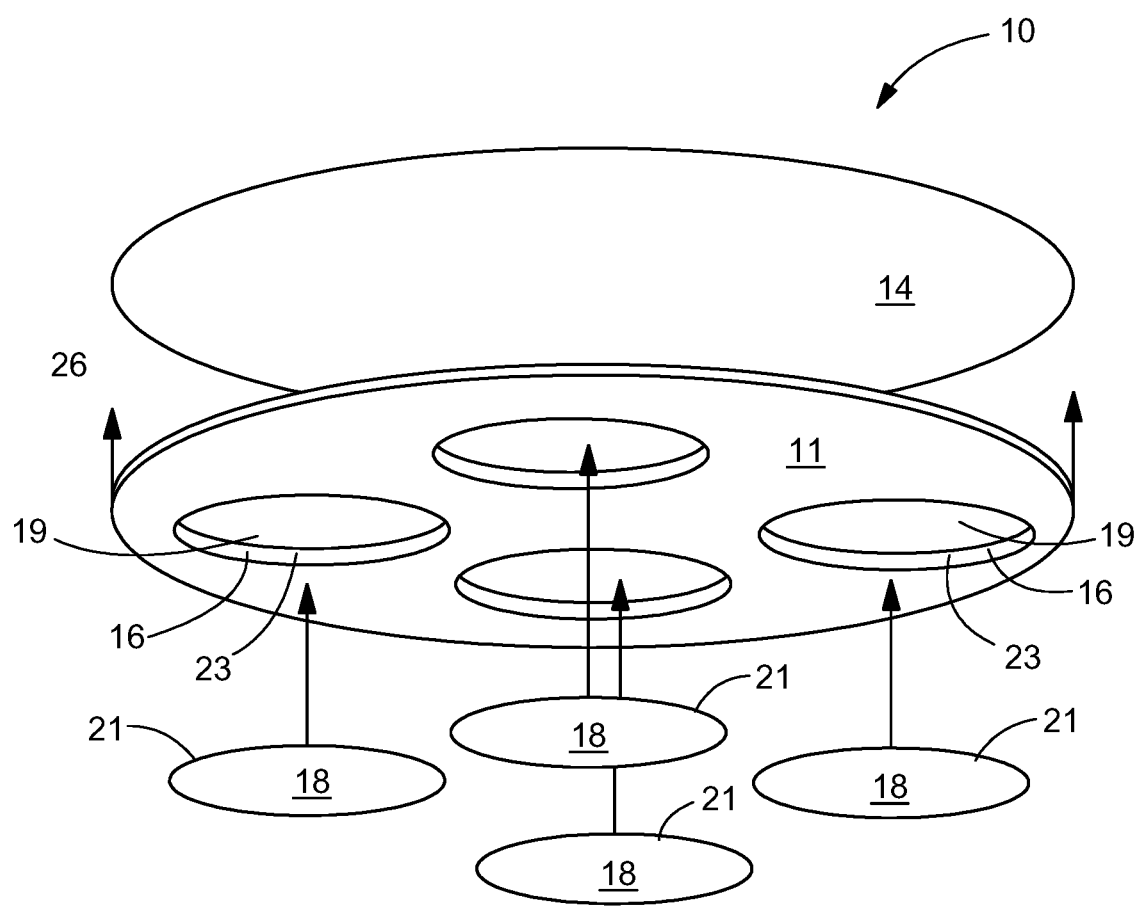
FIG. 3 is an exploded view of the wafer holder of FIG. 1 of the disclosure.

Referring to FIGS. 1-3, a flat template or wafer holder 10 includes a frame 11 that is releasably secured to a carrier 12 by an adhesive layer 14. In another embodiment, carrier(s) and frame portion(s) may be secured to one another without adhesives, such as by molecular fusion or ultrasonic welding. Wafer holder 10 can be composed of a thermoset material and/or a thermoplastic material. In one embodiment, a thermoset material can be bonded to and/or surrounded by a thermoplastic material or vice versa to maximize the performance of wafer holder 10. As shown in FIGS. 2 and 3, frame 11 is of unitary construction or one piece or one component part. Frame 11 of wafer holder 10 has a plurality of openings 16, such as counterbored openings extending partially through wafer holder 10 to a surface 19. Surfaces 19 of counterbored openings 16 have a depth 17. Each opening 16 and corresponding surface 19 defines a cavity 23.

As further shown in FIG. 2, wafer holder 10 includes a shim or a pad or film layer or film, such as a polymer film 18 having an adhesive layer 21 for permanently affixing polymer film 18 to a corresponding surface 19 of counterbored opening 16. A wafer 20 (FIG. 2) is releasably adhered to polymer film 18, such that wafer 20 is releasably secured to and supported by cavity 23 (FIG. 3). The combined thickness of adhesive layer 21, polymer film 18, and wafer 20 exceeds the thickness of depth 17 of cavity 23 of wafer holder 10. As a result, wafer 20 protrudes beyond the adjacent exposed major face of wafer holder 10. Carrier 12 is adapted to rotate around bearing 22 on spindle 24 for purposes of polishing the exposed surface protruding beyond the adjacent exposed major face of wafer holder 10.

As a result of this wafer holder arrangement, in which polymer film is permanently affixed to the wafer holder, the holding and support of the wafer is improved.

In one embodiment, frame 11 is composed of a thermoset epoxy and/or thermoplastic material(s). In one embodiment, frame 11 is visually transparent, permitting an operator to confirm that the application of the adhesive 14 to the carrier 12 has not been compromised by debris or entrapped bubbles. The film's transparency may also permit such a visual confirmation. This ability to visually confirm proper wafer holder mounting is not possible with conventional wafer holders.

As utilized herein, "visually transparent" is intended to indicate a material property of a component sufficiently permitting light to pass through, such that in response to the component being interposed in-line between a vantage point of an observer and an object, the component is viewable by an observer through the component. The term "visually transparent" is intended to include components that are fully visually transparent, partially transparent or translucent or combination thereof Referring to FIGS. 4 and 5, a flat template or wafer holder 100 is similar to wafer holder 10, except as discussed. Wafer holder 100 includes a frame portion 110, also referred to as a base that is releasably secured to a carrier 12 by an adhesive layer 14. In another embodiment, carrier(s) and frame portion(s) may be secured to one another without adhesives, such as by molecular fusion or ultrasonic welding. Wafer holder 100 can be composed of a thermoset material and/or a thermoplastic material. In one embodiment, a thermoset material can be bonded to and/or surrounded by a thermoplastic material or vice versa to maximize the performance of wafer holder 100. Frame portion 110 of wafer holder 100 is permanently secured to frame portion 112 by an adhesive layer 114. Frame portion 112 has a plurality of openings 16 extending therethrough. Upon assembly of frame portions 110, 112 with adhesive layer 114, openings 16 have a closed end corresponding to the facing surface of frame portion 110. Each opening 16 and corresponding facing surface of frame portion 110, i.e., the closed end of opening 16, defines a cavity 23, such as a counterbored cavity having a depth 17. In one embodiment, the wafer holder may include a different number of frame portions.

Figure 4:
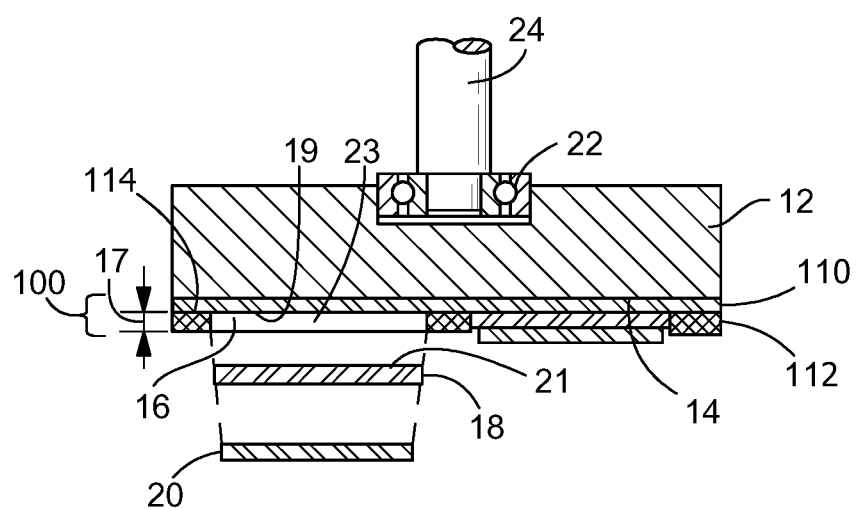
FIG. 4 is a section view of an exemplary embodiment of a wafer holder taken along line 2-2 in FIG. 1 of the disclosure.
Figure 5:
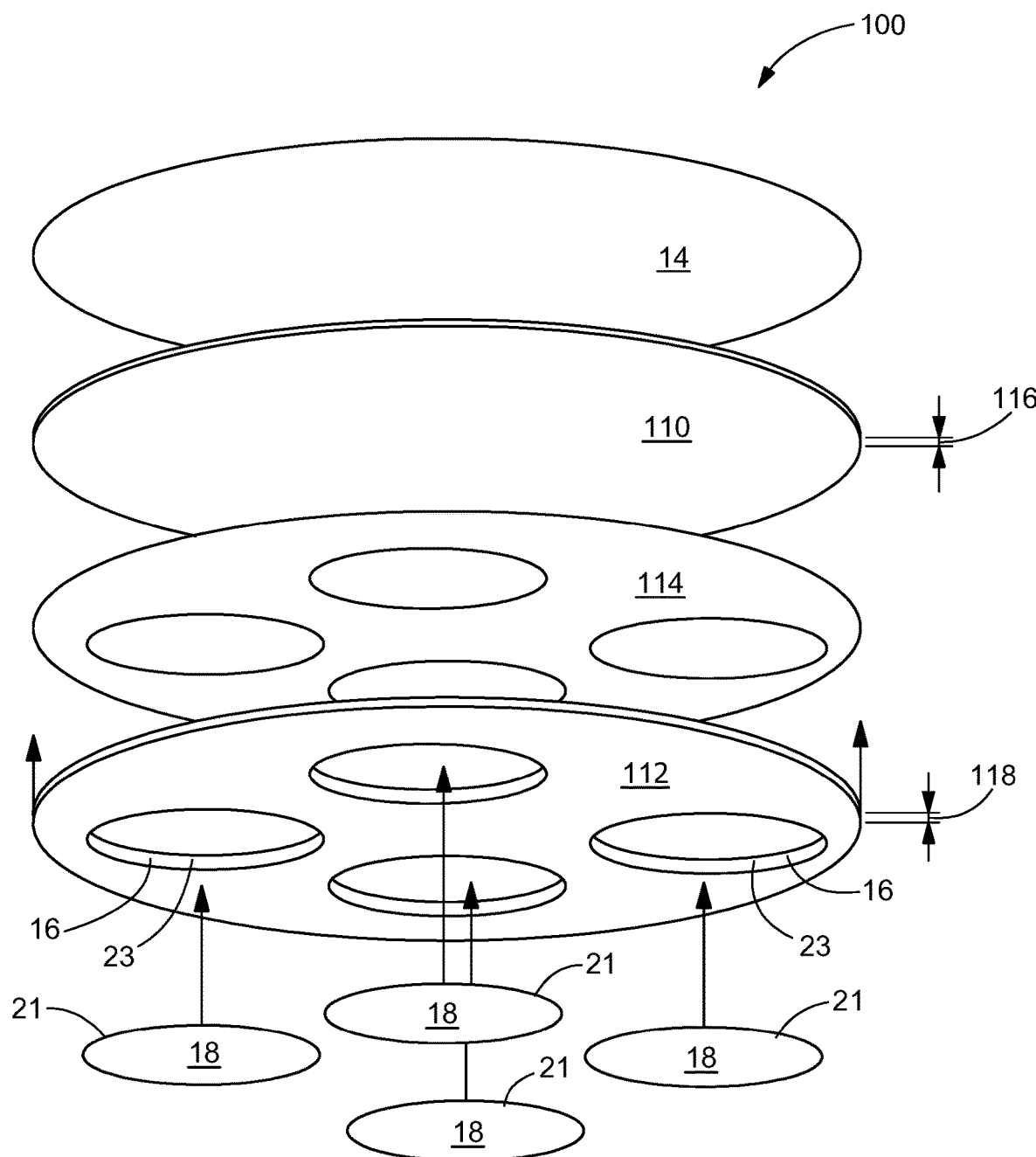
FIG. 5 is an exploded view of the wafer holder of FIG. 4 of the disclosure.

As further shown in FIG. 5, wafer holder 100 includes a shim or a pad or film layer or film, such as polymer film 18 having an adhesive layer 21 for permanently affixing polymer film 18 to a corresponding facing surface of frame portion 110 of counterbored opening 16. A wafer 20 (FIG. 4) is releasably adhered to polymer film 18, such that wafer 20 is releasably secured to and supported by cavity 23 of frame portions 110, 112. As shown in FIG. 4, the combined thickness of adhesive layer 21, polymer film 18, and wafer 20 exceeds the thickness of depth 17 of cavity 23 of wafer holder 100. As a result, wafer 20 protrudes beyond the adjacent exposed major face of wafer holder 100. Carrier 12 is adapted to rotate around bearing 22 on spindle 24 for purposes of polishing the exposed surface protruding beyond the adjacent exposed major face of wafer holder 100.

Figure 6:
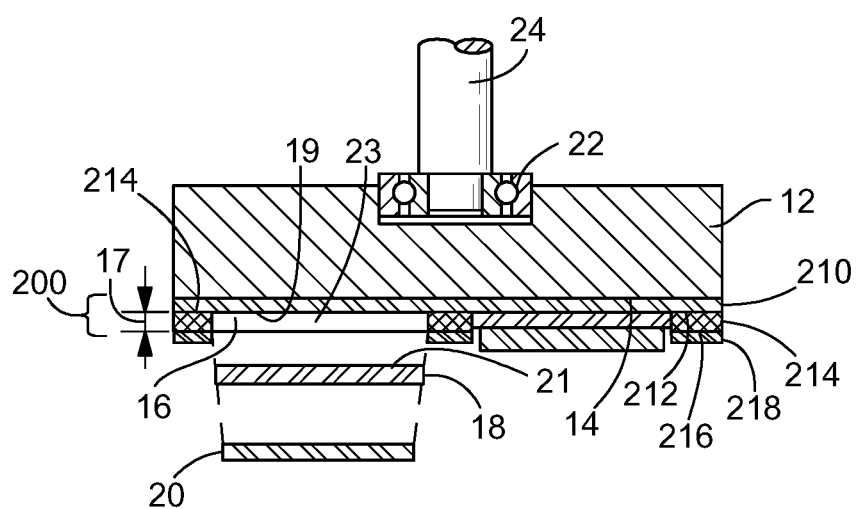
FIG. 6 is a section view of an exemplary embodiment of a wafer holder taken along line 2-2 in FIG. 1 of the disclosure.
Figure 7:
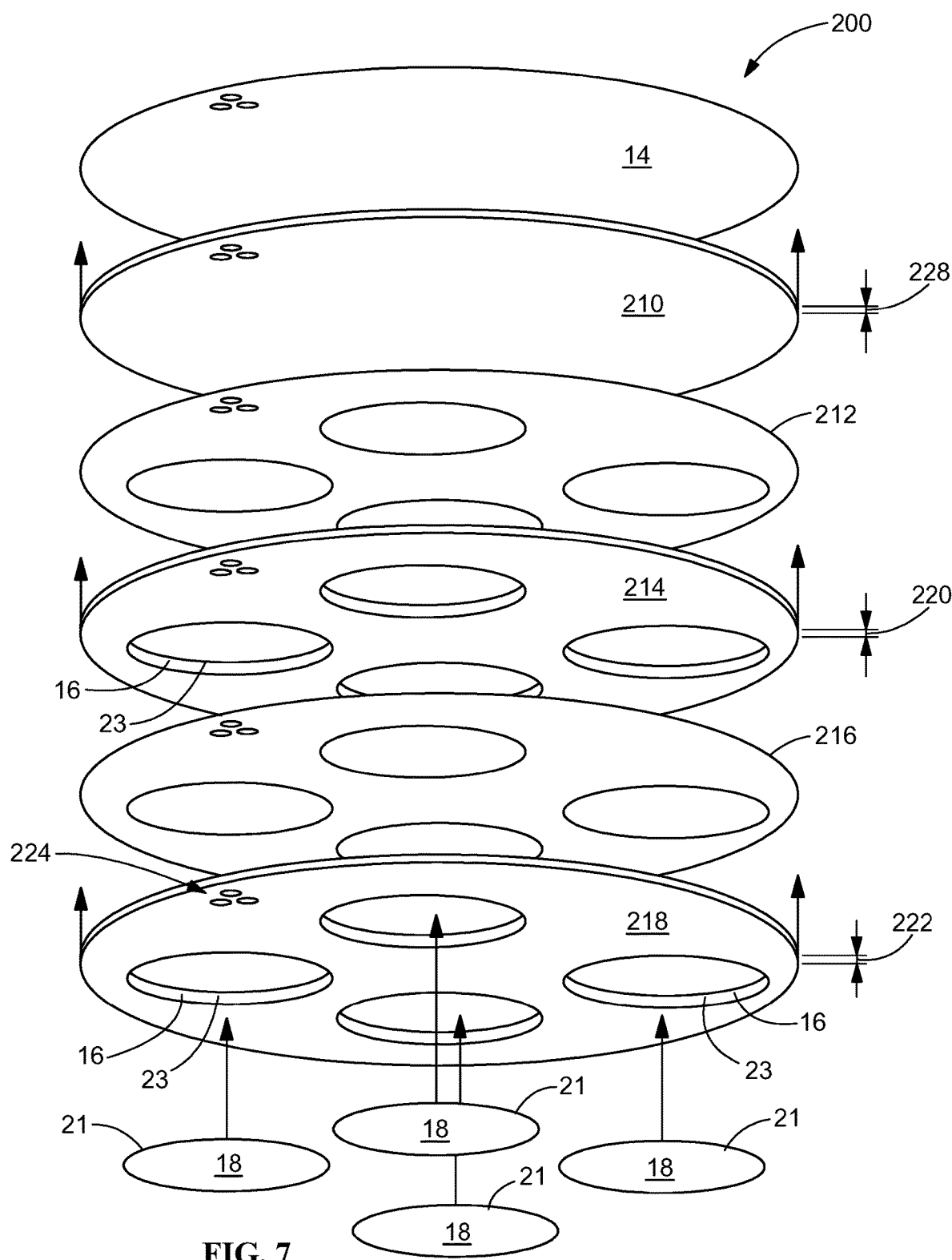
FIG. 7 is an exploded view of the wafer holder of FIG. 6 of the disclosure.

Referring to FIGS. 6 and 7, a flat template or wafer holder 200 is similar to wafer holder 10, except as discussed. Wafer holder 200 includes a third frame portion 210, also referred to as a base that is releasably secured to a carrier 12 by an adhesive layer 14. In another embodiment, carrier(s) and frame portion(s) may be secured to one another without adhesives, such as by molecular fusion or ultrasonic welding. Wafer holder 200 can be composed of a thermoset material and/or a thermoplastic material. In one embodiment, a thermoset material can be bonded to and/or surrounded by a thermoplastic material or vice versa to maximize the performance of wafer holder 200. Third frame portion 210 of wafer holder 200 is permanently secured to second frame portion 214 by an adhesive layer 212. Second frame portion 214 has a plurality of openings 16 extending therethrough. Second frame portion 214 is permanently secured to first frame portion 218 by an adhesive layer 216. As shown, first frame portion 218 has a plurality of openings 116 extending therethrough. Upon assembly of frame portions 210, 214, 218 with respective adhesive layers 212, 216, openings 16 have a closed end corresponding to the facing surface of third frame portion 210. Each opening 16 and corresponding facing surface of third frame portion 210, i.e., the closed end of opening 16, defines a cavity 23, such as a counterbored cavity having a depth 17. In one embodiment, the wafer holder may include a different number of frame portions.

As further shown in FIG. 7, wafer holder 200 includes a shim or a pad or film layer or film, such as polymer film 18 having an adhesive layer 21 for permanently affixing polymer film 18 to a corresponding facing surface of third frame portion 210 of counterbored opening 16. A wafer 20 (FIG. 6) is releasably adhered to polymer film 18, such that wafer 20 is releasably secured to and supported by cavity 23 of frame portions 210, 214, 218. As shown in FIG. 6, the combined thickness of adhesive layer 21, polymer film 18, and wafer 20 exceeds the thickness of depth 17 of cavity 23 of wafer holder 200. As a result, wafer 20 protrudes beyond the adjacent exposed major face of wafer holder 200. Carrier 12 is adapted to rotate around bearing 22 on spindle 24 for purposes of polishing the exposed surface protruding beyond the adjacent exposed major face of wafer holder 100.

An advantage of this construction is to provide a very tightly controlled cavity depth which provides improved polishing consistency between all wafers being processed in the wafer holder at one time and in each polishing machine cycle.

Examples of polymer films include thermoplastic polymers polyaryletherketone (PAEK), polyetheretherketone (PEEK), and polyvinylchloride (PVC), polyurethane, polyethylene, as well as an exemplary thermoset polymer G10, as well as reinforced circuit board materials, such as G10/G11/FR4.

An additional advantage of using polymer film, is that different polymer films can be provided with corresponding wafer holders, resulting in the ability to tailor the wafer holder to provide compatibility with different wafer materials and their corresponding chemical agents which are typically part of the polishing process, including both acidic working or operating environments (e.g., pH<5) as well as basic working or operating environments (e.g., pH>9), including, for example, potassium permanganate (KMnO4).

Use of a polymer film pad permanently affixed in the cavity of a wafer holder provides improved wafer quality and extended service life generally between a factor of approximately two and approximately five times, due to chemical resistance of the chemical agents used. In other words, not only can more tightly controlled flatness tolerances be achieved, but these more tightly controlled flatness tolerances can be achieved for increased durations before corrective measures (i.e., maintenance) are required.

In exemplary embodiments, the polymer layer can have specific or predetermined thermal, chemical resistance, and physical compliance properties required for a tightly controlled, high quality end-user specific polishing process. Additionally, use of polymer film results in elimination of back staining that can occur during use of currently available designs whose pad material consists of Polyurethane® or Felt-based materials during the polishing process.

In exemplary embodiments, the polymer layer can be produced by skiving, extruding, molding or casting.

It has been found that providing wafer holders having permanently affixed polymer layers or films provided to users having polishing machinery results in tighter pocket depth tolerances, as compared to depth tolerances that are achieved from wafer holders having field installed and inserted pads, such as disclosed in U.S. Pat. No. 4,512,113, which can introduce operator-induced dimensional variations.

The current state of the art thickness tolerance for commercially available sheets of thermoset and/or thermoplastic material usable for constructing wafer holders is +/−10 percent, with most sheet material manufacturers still being unable to meet such tolerances in regular production. For purposes herein, "commercially available" is intended to refer to material thickness tolerances that may be maintained at a price feasible for use as wafer holders. Unfortunately, a +/−10 percent thickness variation (~0.004 inch) for an exemplary 0.035 inch thick frame of a wafer holder is excessive, as the thickness variation incorporated into the cavity depth may not provide an acceptable amount of protrusion of the exposed surface of the wafer from the exposed major face of the wafer holder.

Figure 8:
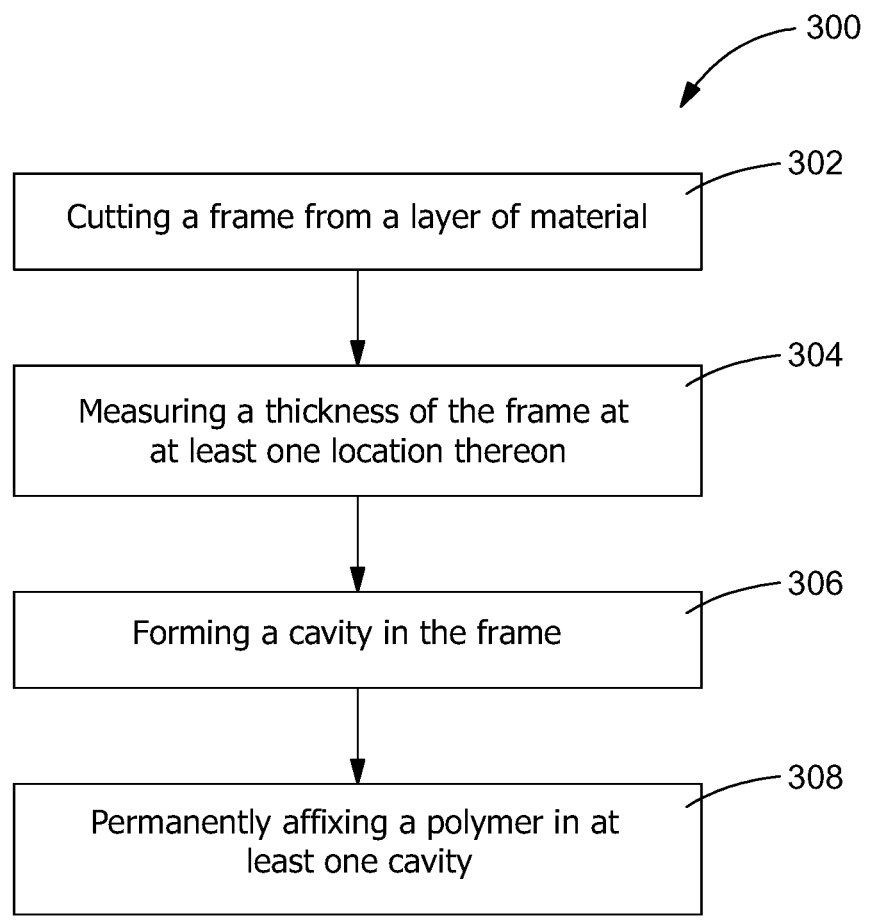
FIG. 8 is a flowchart of a method of manufacturing an exemplary wafer holder of the disclosure.

As shown in FIG. 8, a method 300 for manufacturing a wafer holder is now discussed. As further shown in FIG. 8, block 302 includes cutting a frame 11 (FIG. 3) from a layer of thermoset and/or thermoplastic material. For example, for a 48 inch wide layer of a thermoset and/or thermoplastic material, if frame portions having 20 inch diameters are to be manufactured, side-by-side squares of approximately 21 inches would be cut from the layer. In one embodiment, the layer may be constructed of a suitable metal. The method further includes block 304, which includes measuring a thickness 28 (FIG. 2) of frame portion 11 at at least one location thereon. If more than one thickness measurement is taken, the thickness measurements are averaged. Frame portions having an undesirable thickness measurement or thickness variation between two thickness measurements can be discarded. The method further includes block 306, which includes forming a cavity 23 (FIGS. 2 and 3) in frame portion 11. The cavity has a predetermined depth 17 from the measured thickness 28 of frame 11 via conventional machining or 3D printing. The method further includes block 308, which includes permanently affixing a polymer film pad 18 (FIG. 3) that is sized for cavity 23 in cavity 23. It is to be understood that if more than one cavity is to be formed in the frame, blocks 306-308 of the method are to be repeated.

Figure 9A:
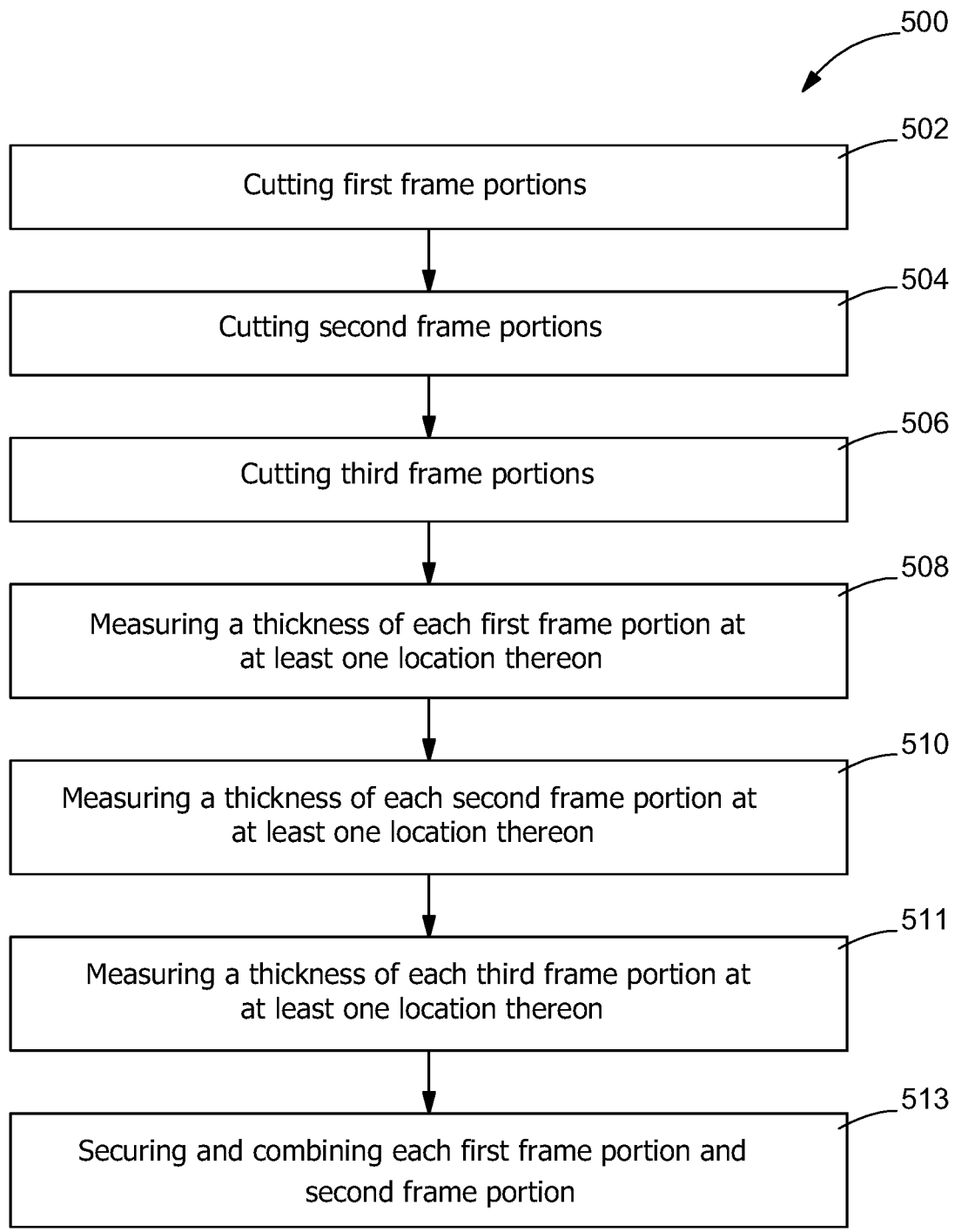
FIG. 9A-9B are process diagrams of a method of manufacturing an exemplary wafer holder of the disclosure.
Figure 9B:
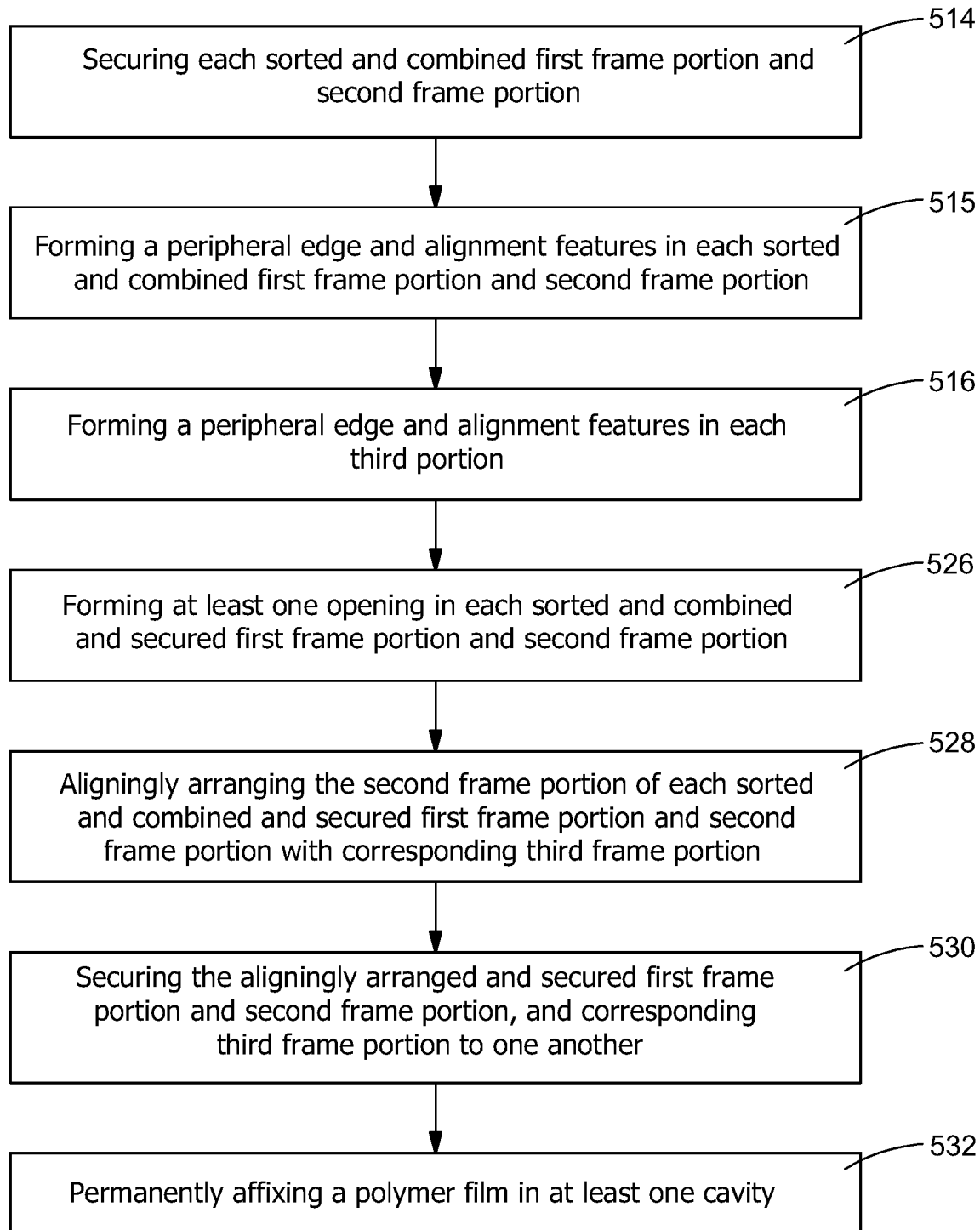

As shown in FIGS. 9A-9B, a method 500 for manufacturing a wafer holder is now discussed. As further shown in FIG. 9A, step or block 502 includes cutting a plurality of first frame portions 218 (FIG. 6) from a first layer of a thermoset and/or thermoplastic material having a first thickness tolerance. For example, for a 48 inch wide layer of a thermoset and/or thermoplastic material, if frame portions having 20 inch diameters are to be manufactured, side-by-side squares of approximately 21 inches would be cut from the layer. The method further includes block 504, which includes cutting a plurality of second frame portions 214 (FIG. 6) from a second layer of a thermoset and/or thermoplastic material having a second thickness tolerance, similar to block 502. The method further includes block 506, which includes cutting a plurality of third frame portions 210, also referred to as bases from a third layer of a thermoset and/or thermoplastic material having a third thickness tolerance, similar to blocks 502, 504. The method further includes block 508, which includes measuring a thickness 222 of each first frame portion 218 of the plurality of first frame portions 218 at at least one location thereon. In one embodiment, in which multiple thickness measurements are taken, the measurements are averaged. The method further includes block 510, which includes measuring a thickness 220 of each second frame portion 214 of the plurality of first frame portions 214 at at least one location thereon. In one embodiment, in which multiple thickness measurements are taken, the measurements are averaged. Optionally, the method includes block 511, which includes measuring a thickness 228 of each third frame portion 210 of the plurality of third frame portions 210 at at least one location thereon. In one embodiment, in which multiple thickness measurements are taken, the measurements are averaged.

Method 500 further includes step or block 513, which includes sorting and combining each first frame portion 218 having a first thickness 222 at a first extent of the first thickness tolerance with a corresponding second frame portion 214 having a second thickness 220 at a second extent of the second thickness tolerance, in which the first extent of the first thickness tolerance is opposite the second extent of the second thickness tolerance. For example, a first frame portion 218 having a thickness 222 at an upper extent of its thickness tolerance is paired or combined with a second frame portion 214 having a thickness 220 at a lower extent of its thickness tolerance. As a result, the imprecision due to the upper and lower tolerance extents of the arranged frame portions 218, 214 is reduced, preferably such that the thickness tolerances generally cancel each other, such that the resulting tolerance of the sum of the thicknesses of the frame portions 218, 214 is reduced, i.e., improving thickness precision.

As shown in FIG. 9B, method 500 further includes block 514, which includes securing, such as by adhesive or non-adhesive techniques as previously discussed, each sorted and combined first frame portion 218 and second frame portion 214 of block 513 to each other. As shown in FIG. 7, adhesive layers are utilized to secure the frame portions to one another, although in another embodiment, non-adhesive techniques may be used. The method further includes block 515, which includes forming a peripheral edge (e.g., forming a circular shape as shown in FIG. 7) and alignment features 224 (FIG. 7), also referred to as tooling holes, such as three holes arranged to form a triangle, in each sorted and combined first frame portion 218 and second frame portion 214. The method further includes block 516, which includes forming a similar peripheral edge and alignment features 224 in each third frame portion 210, as formed in each sorted and combined first frame portion 218 and second frame portion 214 in block 515. In one embodiment, more than one pair of sorted and combined first frame portions 218 and second frame portions 214 and third frame portions 210 may be stacked on top of one another prior to forming the respective peripheral edges and alignment features of the frame portion in respective blocks 514, 516.

Method 500 further includes block 526, which includes forming at least one opening 16 (FIG. 7) in the sorted and combined and secured frame portions 218, 214 of block 514. The method further includes block 528, which includes aligningly arranging (i.e., aligning alignment features 224 (FIG. 7)) the corresponding second frame portion 214 of previously sorted and combined and secured first frame portion 218 and second frame portion 214 of block 514 with a corresponding third frame portion 210. Once the corresponding frame portions 218, 214, 210 have been aligningly arranged in block 528, they are secured to each other in block 530, thereby forming frame 100 having at least one cavity 23. That is, the surface 19 (FIG. 6) of third frame portion 210 facing second frame portion 214 forms the bottom surface of at least one cavity 23. The method further includes block 532, in which polymer film pad 18 (FIG. 7) sized for cavity 23 is permanently affixed in each cavity 23.

It is to be understood the order of blocks of the method may be different than as disclosed above. In one embodiment, the thicknesses of the frame portions may be the same.

In one exemplary embodiment of the method shown in FIGS. 9A-9B, for frame portion 200 as shown in FIG. 7, one first layer of thermoset and/or thermoplastic material is 0.015 inch having a thickness tolerance of +/−0.0015, a second layer of thermoset and/or thermoplastic material is 0.020 inch having a thickness tolerance of +/−0.0020, and a third layer of thermoset and/or thermoplastic material is 0.010 having a thickness tolerance of +/−0.001. First frame portions 218 are cut from the first layer, second frame portions 214 are cut from the second layer, and third frame portions 210 are cut from the third layer. The thicknesses of each of the frame portions 218, 214, 210 are measured at at least one location, with multiple thickness measurements being averaged. Once measured, first frame portions 218 having a thickness at the upper extent of their thickness tolerance are arranged with corresponding second frame portions 214 having thicknesses at the lower extent of their thickness tolerance. As a result, the imprecision due to the tolerance extents of the arranged first and second frame portions 210, 212 are reduced, preferably such that the thickness tolerances generally cancel each other, resulting in the frame 200 formed from the arranged first and second frame portions 218, 214 having a combined thickness of 0.035 inch that may be more precisely controlled than previously possible with state of the art commercially available frame material layers. Thickness tolerances for adhesive layers 216, 212 are negligible, and the thickness tolerance of pad 18 is typically between +/−0.0005 inch and 0.001 inch.

By utilizing the above methods, Applicant can provide frames having cavities with consistently improved thickness precision, typically with a cavity depth variance of approximately 0.002 inch, or less, using state of the art commercially available frame material layers. Such precision results in all cavities being substantially symmetrical, or stated another way, the cavities having substantially the same tolerance. This improved precision, by permitting wafers to be processed as identically as possible, provides improved polishing consistency between all wafers being processed in the wafer holder at one time and in each polishing machine cycle.

When compared with current popular design consisting of a film with equivalent diameter to the shell—from FIG. 7 this common design's raw materials would all have the same outer diameter. That is, pad 18 would have the same diameter as first, second and third frame portions 218, 214 and 210, and would be inserted between second frame portion 214 and third frame portion 210. Additional benefits associated with the use of polymer film materials is that the population of materials, sometimes referred to as pad materials or pads, can be incorporated into a "fixed" template or wafer holder without having to be concerned with pad porosity versus adhesive volume, which can impact variation between wafer holder cavities and overall wafer quality achieved in the polishing process. Pad porosity is primarily concerned with the open volume of the pad which must be filled to create a seal sufficient to control slurry intrusion. Slurry intrusion eventually creates back staining, which can be difficult to remove, and is undesirable for workpieces or wafers being processed.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of manufacturing a wafer holder, the wafer holder having a frame having at least one cavity capable of receiving and supporting a wafer grown from an ingot to be polished in a polishing machine, the at least one cavity having a cross sectional footprint at least equal to a cross sectional footprint of the wafer, the wafer having a thickness to cross sectional area ratio of 0.001 per unit length or less, a polymer film pad being permanently affixed in the at least one cavity, comprising:

cutting a plurality of first frame portions from a first layer of a thermoset or thermoplastic material having a first thickness tolerance;

cutting a plurality of second frame portions from a second layer of a thermoset or thermoplastic material having a second thickness tolerance;

cutting a plurality of third frame portions from a third layer of a thermoset or thermoplastic material having a third thickness tolerance;

measuring a thickness of each first frame portion at at least one location thereon;

measuring a thickness of each second frame portion at at least one location thereon;

sorting and combining each first frame portion having a first thickness at a first extent of the first thickness tolerance with a corresponding second frame portion having a second thickness at a second extent of the second thickness tolerance, wherein the first extent of the first thickness tolerance is opposite the second extent of the second thickness tolerance to thereby reduce the resulting tolerance of the sum of the thickness of the first and second frame portions;

securing each sorted and combined first frame portion and second frame portion to one another;

forming a peripheral edge and alignment features in each sorted and combined first frame portion and second frame portion;

forming a peripheral edge and alignment features in each third frame portion;

forming at least one opening in each sorted and combined and secured first frame portion and second frame portion;

alignignly arranging the corresponding second frame portion of each sorted and combined and secured second frame portion with a corresponding third frame portion;

securing each sorted and combined and secured first frame portion and second frame portion, and corresponding third frame portion to one another, thereby forming a frame having at least one cavity; and permanently affixing a polymer film pad in the at least one cavity.

2. The method of claim 1, wherein at least the first layer of the thermoset or thermoplastic material and the second layer of the thermoset and/or thermoplastic material are the same layer.

* * * * *